United States Patent
Cornet et al.

(10) Patent No.: US 7,613,753 B2
(45) Date of Patent: Nov. 3, 2009

(54) PLATFORM AND METHOD FOR FUNCTIONAL PROGRAMMING (FP) PROCESSING

(75) Inventors: Jerome Cornet, Ottawa (CA); Brian McBride, Carp (CA); Piragash Velummylum, Seattle, WA (US)

(73) Assignee: Alcatel Lucent, Paris (FR)

( * ) Notice: Subject to any disclaimer, the term of this patent is extended or adjusted under 35 U.S.C. 154(b) by 220 days.

(21) Appl. No.: 11/604,722

(22) Filed: Nov. 28, 2006

(65) Prior Publication Data
US 2008/0126453 A1 May 29, 2008

(51) Int. Cl.
*G06F 17/30* (2006.01)
(52) U.S. Cl. ...................................... 707/206
(58) Field of Classification Search ........... 707/3, 707/9, 10, 200–206
See application file for complete search history.

(56) References Cited

U.S. PATENT DOCUMENTS

| | | | |
|---|---|---|---|
| 6,052,713 A * | 4/2000 | Kim | 709/213 |
| 6,148,391 A * | 11/2000 | Petrick | 712/202 |
| 2004/0199556 A1* | 10/2004 | Garthwaite | 707/206 |
| 2004/0215880 A1* | 10/2004 | Chilimbi et al. | 711/118 |
| 2004/0250041 A1* | 12/2004 | Sollich | 711/170 |
| 2005/0021871 A1* | 1/2005 | Georgiou et al. | 709/250 |
| 2006/0143359 A1* | 6/2006 | Dostert et al. | 711/6 |
| 2006/0253498 A1* | 11/2006 | Barrs et al. | 707/200 |
| 2007/0011227 A1* | 1/2007 | Johnson | 709/203 |
| 2008/0046668 A1* | 2/2008 | Newburn et al. | 711/154 |

OTHER PUBLICATIONS

Maxim, Dual Port RAM, 2001.*

* cited by examiner

*Primary Examiner*—Wilson Lee
(74) *Attorney, Agent, or Firm*—Kramer & Amado, P.C.

(57) ABSTRACT

A system and method are provided for enabling an efficient processing environment for a functional programming language runtime machine. Separate processors are provided for the main FP processor and the garbage collector as well as separate access to the heap. The routine maintenance performed by the garbage collector does not compete for resources of the main FP processor. The processor implementation for the main FP processor also includes a separate bus to each of the program memory, the heap, and the stacks.

14 Claims, 2 Drawing Sheets

PLATFORM AND METHOD FOR FUNCTIONAL PROGRAMMING (FP) PROCESSING

FIELD OF THE INVENTION

The invention relates to a hardware platform and method for a runtime machine, and more particularly to a hardware platform and method for a functional programming language runtime machine.

BACKGROUND OF THE INVENTION

Most information technology and in particular hardware is tailored to meet the needs of imperative language based code. This is due to the serial nature of classic processors and the stepwise iterative approach to execution of commands and manipulation of data in an imperative language based program.

Functional programming languages (FPs) are typified by a particular style of programming which focuses upon the function as the central building block of its functionality. Each function is seen as having an input and as generating an output. A pure functional language has no side effects, changes no state variables and is merely a function of starting parameters which may be other functions. The result of a routine is an output which is independent of when and where in the code of the routine is run. This lends to such properties as modularity, parallelism, and referential transparency among others.

Functional programming language based programs are more capable in terms of possible inherent parallel functioning on machines running FP code. Typical current implementations of FP code, on a classic processor and in classic processing platforms, are carried out by mimicking parallelism by running the small parts of the parallel FP processes interleaved in time on the processor. An FP application is often run as a virtual machine on top of a single processor in a classic processing platform.

An example of a classic processing platform in which an FP application operates is presented in FIG. 1.

A virtual machine 100 operates on top of a processor 150 having registers 152. The virtual machine 100 operates an FP application which comprises a number of processes including a garbage collector 120. The remaining functionality of the FP application is shown as an FP process 110. The garbage collector 120 is a necessary part of any functional program which serves to remove any unused objects in memory. The garbage collector 120 and the FP process 110 have virtualized access 125 to resources of the processor 150 including its registers 152. Both the FP process 110 and the garbage collector 120 are coupled over a memory bus 145 to a program 172, a heap 174, a first stack 176, and a second stack 178 of a memory 170.

In terms of function, both the FP process 110 and the garbage collector 120 share both processor 150 time (and hence share access to the registers 152), bus 145 resources, and memory 170 access. This is an inefficient way of executing parallel processes, which becomes increasingly inefficient as the number of simulated parallel processes increases. Each parallel process requires access 125 to processor 150 time, bus 145 resources, and access to the program 172, the heap 174, and the stacks 176, 178 stored in memory 170. As such each process is provided, one at a time, a finite time slice during which it may use said processor time, bus resources, and memory access. Moreover, the prior art processing platforms of FIG. 1 often results in extremely variable execution times which can depend upon memory usage.

SUMMARY OF THE INVENTION

According to one aspect, the invention provides for a system for a runtime machine executing an FP program comprising: a first processor for implementing said runtime machine; a heap memory for storing a heap for use by said first processor; a first heap memory bus coupled to said first processor and said heap memory for providing access to said heap by said runtime machine; a second processor for executing a garbage collector; and a second heap memory bus coupled to said second processor and said heap memory for providing access to said heap by said garbage collector, wherein access by said first processor to said heap is uninterrupted by said access by said second processor to said heap.

In some embodiments of the invention, said garbage collector and said runtime machine share said heap memory by accessing it at different times.

In some embodiments of the invention, said heap memory is a dual port memory coupled to said first heap memory bus over a first port and coupled to said second heap memory bus over a second port, whereby said garbage collector and said runtime machine may access said heap memory independently and simultaneously.

In some embodiments of the invention, the first processor comprises a plurality of sub-processors.

Some embodiments of the invention further provide for a program memory for storing a program code of said FP program for execution by said runtime machine; and a program memory bus coupled to said first processor and coupled to said program memory for access by said runtime machine to said program code.

Some embodiments of the invention further provide for a plurality of stack memories for storing a corresponding plurality of program stacks for use by said runtime machine on said first processor; and a plurality of stack memory buses, each stack memory bus coupled to a corresponding stack memory of said plurality of stack memories and coupled to said first processor, said plurality of stack memory buses for access by said runtime machine to said plurality of program stacks.

In some embodiments of the invention, each said stack memory bus provides independent and simultaneous access to said corresponding stack memory by a subprocess of said FP program, each subprocess running on a respective FP sub-processor implemented on a respective sub-processor of said plurality of sub-processors.

According to another aspect, the invention provides for a method for processing a runtime machine executing an FP program, the method comprising: providing access by a first processor implementing said runtime machine to a heap memory over a heap memory bus; and providing access by a second processor implementing a garbage collector to said heap memory over a second heap memory bus such that said access by the first processor to said heap memory is uninterrupted by said access by said second processor to said heap memory.

In some embodiments of the invention said access to said heap memory by said garbage collector is provided at times during which said first processor is not accessing said heap memory.

In some embodiments of the invention said heap memory is a dual port memory, and said providing access by said first processor and said providing access by said second processor occurs independently and simultaneously.

Some embodiments of the invention further provide for providing access by said first processor to a program memory for storing a program code of said FP program for execution by said runtime machine on said first processor.

Some embodiments of the invention further provide for providing access by said first processor to a plurality of stack memories for storing a corresponding plurality of program stacks for use by said runtime machine on said first processor.

In some embodiments of the invention providing access by said first processor to a plurality of stack memories comprises: providing independent and simultaneous access to each stack memory of said plurality of stack memories by a subprocess of said FP program running on a respective FP sub-processor implemented on a respective sub-processor of said plurality of sub-processors.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
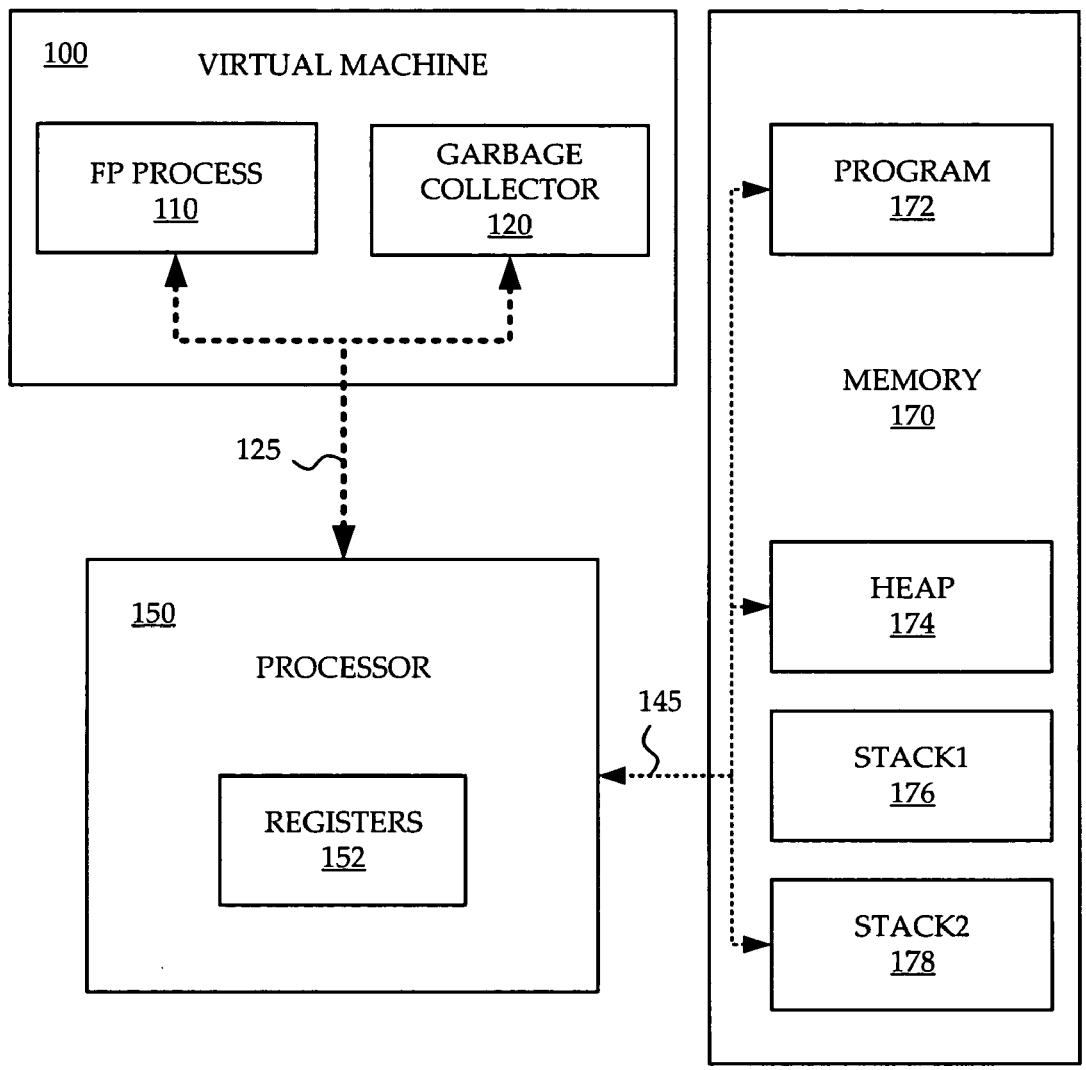
FIG. 1 is a schematic block diagram of a prior art processing platform in which a functional programming (FP) application is run as a virtual machine.
Figure 2:
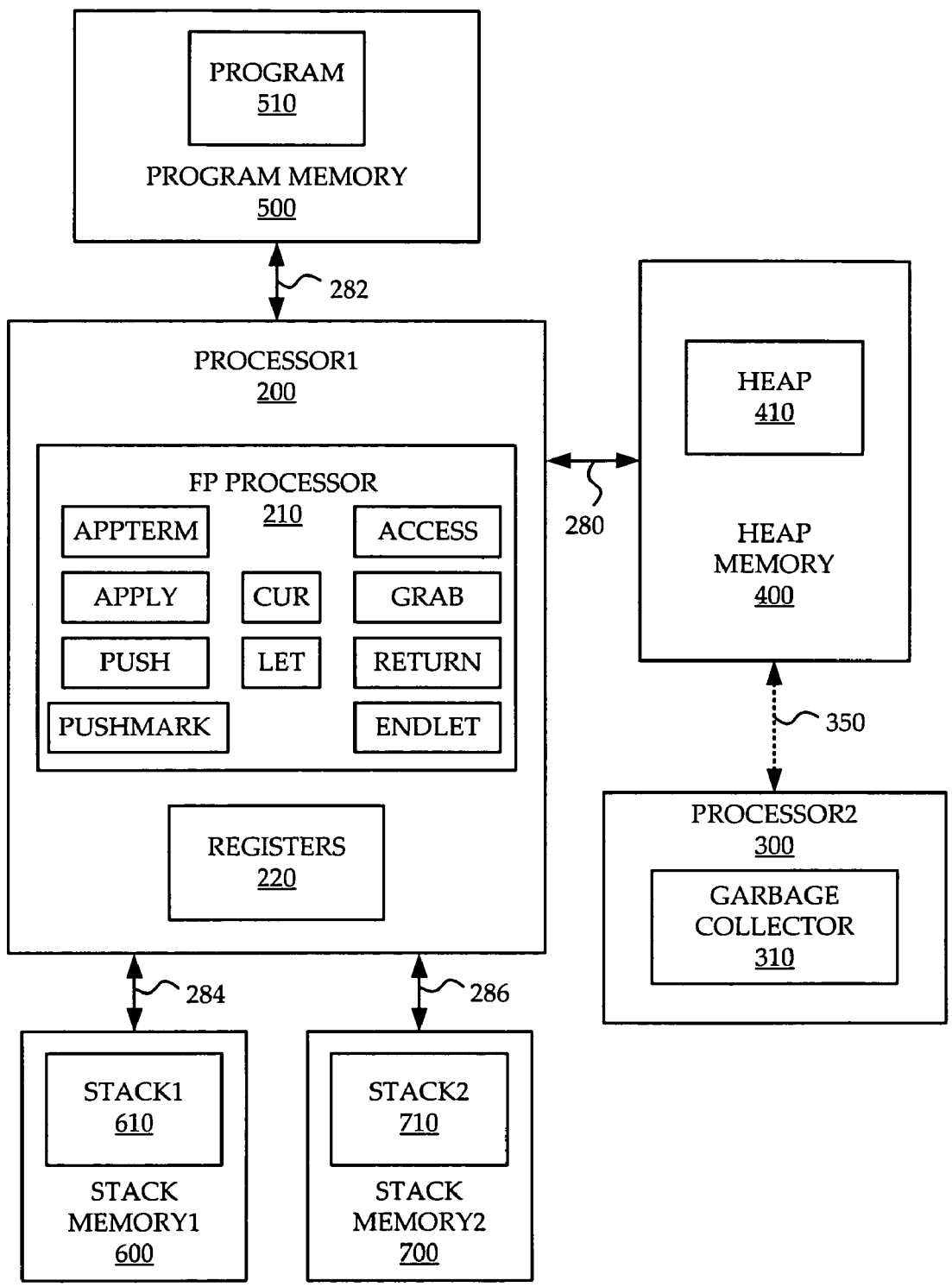
FIG. 2 is a schematic block diagram of an FP processing platform for a run time machine executing FP processes according to a preferred embodiment of the invention.

Referring to FIG. 2, a processing platform for an FP code based runtime machine will now be discussed in terms of structure.

An FP processing platform is split into two main parts, an FP processor 210 implemented on a first processor 200, and a garbage collector 310 running on a second processor 300.

The first processor has registers 220. The first processor 200 is connected via a first heap memory bus 280 to a heap memory 400 having a heap 410 therein for the FP processor 210. The first processor 200 is connected via a program memory bus 282 to a program memory 500 having a program 510 stored therein. The program 510 corresponds to a stored version of the code which directs the FP processor 110 of the processor 200 to execute an FP application. The first processor 200 is connected via a first stack memory bus 284 and a second stack memory bus 286 to a first stack memory 600 and second stack memory 700 respectively. The first stack memory 600 has a first stack 610 stored therein, while the second stack memory 700 has a second stack 710 stored therein.

The second processor 300 is connected via a second heap memory bus 350 to the heap memory 400.

On the first processor 200 the FP processor 210 is an implementation, preferably in hardware, of a functional programming language interpreter. Preferably, FP processor 210 is implemented in an FPGA. Discussion of the details of any particular implementation of the FP processor 210 is beyond the scope of discussion sufficient to describe the preferred embodiments of the novel platform provided for the FP processor 210. The novel platform depicted in FIG. 2 is accordingly arranged to accommodate any FP processor 210 which is a functioning functional programming language interpreter.

An example of an implementation of a functional programming language interpreter may be found in a paper by Xavier Leroy entitled *The ZINC Experiment: An Economical Implementation of the ML Language*, Rapports Techniques No. 117, Ecole Normale Superieure et INRIA Roccquencourt, 1990, which is herein incorporated by reference.

The processing platform of FIG. 2 will now be described in terms of function.

Each of the first heap memory bus 280, the program memory bus 282, and the first and second stack memory buses 284, 286 is an independent bus which the first processor 200 and any processes running thereon can have simultaneous and independent access to. In a preferred embodiment the first processor 200 is a parallel processor comprising a number of sub-processors which have access to each of the memory buses 280, 282, 284, 286 in a simultaneous and independent manner. In the preferred embodiment, the FP processor 210 comprises a number of FP sub-processors implemented and running in parallel on respective sub-processors of the first processor 200. By providing simultaneous and independent access to the buses 280, 282, 284, 286, more than one FP sub-processor can be engaged in input or output operations, which is more efficient in using resources than sequential access via a single bus. Functionally the FP processor 210 is a hardware implementation of a functional programming interpreter, and is capable of correctly processing any code written in the FP language based program the interpreter is designed for. This functional programming core preferably is able to perform FP based commands equivalent to the following ZINC machine commands: Appterm; Apply; Push; Pushmark; Access; Cur; Grab; Return; Let; and Endlet.

Access to the first and second stack by the FP processor 210 is not interfered with by the parallel processing of the garbage collector 310 on the second processor 300 because the garbage collector 310 does not need and does not use any of the first processor's 200 processing time, and does not need access to the stacks 610, 710 and hence does not require any resources or time from the first and second stack memory buses 284, 286 which are dedicated to the first processor 200 and are separate and independent from each other.

Access to registers 220 by the FP processor 210 running on the first processor 200, access to the program 510 of the program memory over the program memory bus 282, and access to the heap 410 of the heap memory 400 over the first heap memory bus 280 are not interfered with by the garbage collector 310.

The parallel process of the garbage collector 310 only uses up spare memory cycles of the heap memory 400 to access the heap memory 400. The FP processor 210 of the first processor 200 will not require on every clock cycle, access to the heap memory 400, allowing ample access by the garbage collector 310 between accesses by the FP processor 210.

Preferably the method used for garbage collection is the mark and sweep method commonly used with garbage collectors in virtual machines. According to one specific embodiment, the garbage collector 310 marks sections of the heap 410 to be cleaned. Those sections which are accessible and used by the FP processor 210 are left unmarked and hence are not cleaned. The heap 410 is then swept by the garbage collector 310 by searching and finding marked portions in the heap 410. The sweeps can be scheduled to be periodic or intermittent. In a preferred embodiment the sweep is performed in a manner which does not take away from access time to the heap 410 required by the FP processor 210.

Although reference is made to the mark and sweep method of garbage collection, other methods may be used, still benefiting from the garbage collector's independent memory bus 350 to the heap.

It should be understood that although only two stack memories 600, 700 and two program stacks 610, 710 have been referred to, in general the first processor 200 may be coupled to any number of stack memories each having a corresponding program stack therein over a corresponding number of stack memory buses. Each of these buses would provide independent access to the first processor and its sub-processors.

In an exemplary embodiment the heap memory 400 is a dual port memory providing separate and independent access to the heap 410 by the first processor 200 over the first heap memory bus 280 and by the second processor 300 over the second heap memory bus 350. In this embodiment, coordination of access to the heap memory 400 between the FP processor 210 and the garbage collector 310 is not an issue. Timing for sweeps conducted by the garbage collector 310 can be according to any schedule and will occur without interruption by the FP processor 210, and without affecting access to the heap memory 400 by the FP processor 210.

The embodiments presented are exemplary only and persons skilled in the art would appreciate that variations to the embodiments described above may be made without departing from the spirit of the invention. The scope of the invention is solely defined by the appended claims.

We claim:

1. A system for a runtime machine executing an FP program comprising:
    a first processor capable of implementing said runtime machine;
    a first heap memory bus coupled to said first processor;
    a heap memory coupled to said first heap memory bus for storing a heap accessible by and for use by said first processor implementing said runtime machine;
    a second processor capable of executing a garbage collector; and
    a second heap memory bus coupled to said second processor and to said heap memory for providing access to said heap by said second processor executing said garbage collector on said heap,
    wherein said second processor is capable of accessing and executing said garbage collector on said heap in said heap memory without interrupting access by said first processor to said heap in said heap memory.

2. The system of claim 1 wherein said second processor executing said garbage collector and said first processor implementing said runtime machine share said heap memory by said first processor accessing it through the first heap memory bus at times different than the second processor accessing it through the second heap memory bus.

3. The system of claim 1 wherein said heap memory is a dual port memory coupled to said first heap memory bus over a first port and coupled to said second heap memory bus over a second port, whereby each of said second processor executing said garbage collector and said first processor implementing said runtime machine is capable of accessing said heap memory independent from the other, wherein said capability of independent access includes the first processor and the second processor simultaneously accessing said heap memory.

4. The system of claim 1 wherein the first processor comprises a plurality of sub-processors.

5. The system of claim 4 further comprising:
    a program memory for storing a program code of said FP program for execution by said first processor implementing said runtime machine; and
    a program memory bus coupled to said first processor and coupled to said program memory for access by said first processor implementing said runtime machine to said program code.

6. The system of claim 5 further comprising:
    a plurality of stack memories for storing a corresponding plurality of program stacks for use by said runtime machine on said first processor; and
    a plurality of stack memory buses, each stack memory bus coupled to a corresponding stack memory of said plurality of stack memories and coupled to said first processor, said plurality of stack memory buses for access by said runtime machine to said plurality of program stacks.

7. The system of claim 6 wherein each said stack memory bus provides independent and simultaneous access to said corresponding stack memory by a subprocess of said FP program, each subprocess running on a respective FP sub-processor implemented on a respective sub-processor of said plurality of sub-processors.

8. A method for processing a runtime machine executing an FP program, the method comprising:
    providing access by a first processor implementing said runtime machine to a heap in a heap memory over a first heap memory bus;
    providing access to the heap by a second processor capable of implementing a garbage collector on said heap in said heap memory over a second heap memory bus; and
    said second processor implementing said garbage collector on said heap in said heap memory,
    wherein the second processor implementing said garbage collector on said heap includes the second processor accessing said heap memory over said second heap memory bus without interrupting the first processor implementing said runtime machine accessing said heap in said heap memory.

9. The method of claim 8 wherein said access to said heap in said heap memory by said second processor implementing said garbage collector is provided at times during which said first processor is not accessing said heap in said heap memory.

10. The method of claim 8 wherein said heap memory is a dual port memory, and said providing access by said first processor and said providing access by said second processor provides each of said accesses as being capable of accessing said heap memory independent from the other, wherein said capability of independent access includes the first processor and the second processor simultaneously accessing said heap memory.

11. The method of claim 8 wherein the first processor comprises a plurality of sub-processors.

12. The method of claim 11 further comprising:
    providing access by said first processor to a program memory for storing a program code of said FP program for execution by said runtime machine on said first processor.

13. The method of claim 12 further comprising:
    providing access by said first processor to a plurality of stack memories for storing a corresponding plurality of program stacks for use by said runtime machine on said first processor.

14. The method of claim 13 wherein providing access by said first processor to a plurality of stack memories comprises:

provisioning independent and simultaneous access to each stack memory of said plurality of stack memories by a subprocess of said FP program running on a respective FP sub-processor implemented on a respective sub-processor of said plurality of sub-processors.

* * * * *